(12) United States Patent
Swinyard et al.

(10) Patent No.: US 7,677,279 B2
(45) Date of Patent: Mar. 16, 2010

(54) DELIMB KNIFE MOUNTING ARRANGEMENT FOR TREE HARVESTER HEAD

(75) Inventors: Douglas Craig Swinyard, Rotorua (NZ); Justyn Peter Smythe, Cambridge (NZ)

(73) Assignee: Deere & Company, Moline, IL (US)

( * ) Notice: Subject to any disclaimer, the term of this patent is extended or adjusted under 35 U.S.C. 154(b) by 311 days.

(21) Appl. No.: 11/669,564

(22) Filed: Jan. 31, 2007

(65) Prior Publication Data

US 2008/0178963 A1    Jul. 31, 2008

(51) Int. Cl.
*A01G 23/095* (2006.01)
(52) U.S. Cl. .................... 144/24.13; 144/4.1; 144/208.1
(58) Field of Classification Search .............. 144/24.13, 144/4.1, 34.1, 208.5, 338
See application file for complete search history.

(56) References Cited

U.S. PATENT DOCUMENTS

| | | | |
|---|---|---|---|
| 6,318,425 B1 * | 11/2001 | Niemi | 144/343 |
| 6,516,841 B1 * | 2/2003 | Oilund | 144/4.1 |
| 6,622,761 B1 * | 9/2003 | Paakkunainen et al. | 144/24.13 |
| 7,185,686 B2 * | 3/2007 | Ketonen | 144/4.1 |
| 2007/0125447 A1 * | 6/2007 | Alfthan | 144/343 |

FOREIGN PATENT DOCUMENTS

| | | |
|---|---|---|
| DE | 19628889 A1 | 1/1997 |
| SE | 469774 B | 9/1993 |
| WO | WO 0015026 A1 | 3/2000 |
| WO | WO 0219801 A1 | 3/2002 |
| WO | WO 0245482 A1 | 6/2002 |

OTHER PUBLICATIONS

Ponsse Product Brochure (2005).
Ponsse Product Brochure (2 sheets)(2005).
HTH 622B Upper Delimb Arm and Measuring Wheel Assembly Drawings (3 sheets)(prior art).

* cited by examiner

*Primary Examiner*—Shelley Self

(57) ABSTRACT

A tree harvester head comprises a drive wheel, a delimb knife, a pin, a wheel-mounting inner sleeve to which the drive wheel is mounted, and a knife-mounting outer sleeve to which the delimb knife is mounted. The wheel-mounting inner sleeve surrounds the pin for rotation of the wheel-mounting inner sleeve and the drive wheel mounted thereto about the pin. The knife-mounting outer sleeve surrounds the wheel-mounting inner sleeve for relative rotation therebetween for rotation of the delimb knife about the pin.

8 Claims, 4 Drawing Sheets

DELIMB KNIFE MOUNTING ARRANGEMENT FOR TREE HARVESTER HEAD

FIELD OF THE DISCLOSURE

The present disclosure relates to tree harvester heads.

BACKGROUND OF THE DISCLOSURE

A tree harvester head is used to process a tree. The harvester head is normally attached to the end of an arm of a forestry work machine. In operation, the head grips an upright growing tree and fells it. One or more drive wheels of the head feed the felled tree through the head during which one or more delimb knives delimb branches from the tree trunk. If configured to do so, the head may then cut the delimbed tree trunk into pieces or fixed length with a chain saw or other cutting device.

The delimb knives may be located on one or both sides of the drive wheels. For applications involving trees with branches near the tree base, it may be particularly useful to employ a lower delimb knife on the same side of the drive wheels as the butt saw.

SUMMARY OF THE DISCLOSURE

According to the present disclosure, there is provided a tree harvester head. The tree harvester head comprises a drive wheel, a delimb knife, a pin, a wheel-mounting inner sleeve to which the drive wheel is mounted, and a knife-mounting outer sleeve to which the delimb knife is mounted. The wheel-mounting inner sleeve surrounds the pin for rotation of the wheel-mounting inner sleeve and the drive wheel mounted thereto about the pin. The knife-mounting outer sleeve surrounds the wheel-mounting inner sleeve for relative rotation therebetween for rotation of the delimb knife about the pin.

Such an arrangement provides a relatively efficient use of space on the harvester head, promotes handling of relatively high stresses imparted to the delimb knife during operation, and is relatively readily serviceable. Moreover, for these reasons, it is particularly useful in cases where the delimb knife is a lower delimb knife.

The above and other features will become apparent from the following description and the attached drawings.

BRIEF DESCRIPTION OF THE DRAWINGS

The detailed description of the drawings refers to the accompanying figures in which.

DESCRIPTION OF THE DRAWINGS

Figure 1:
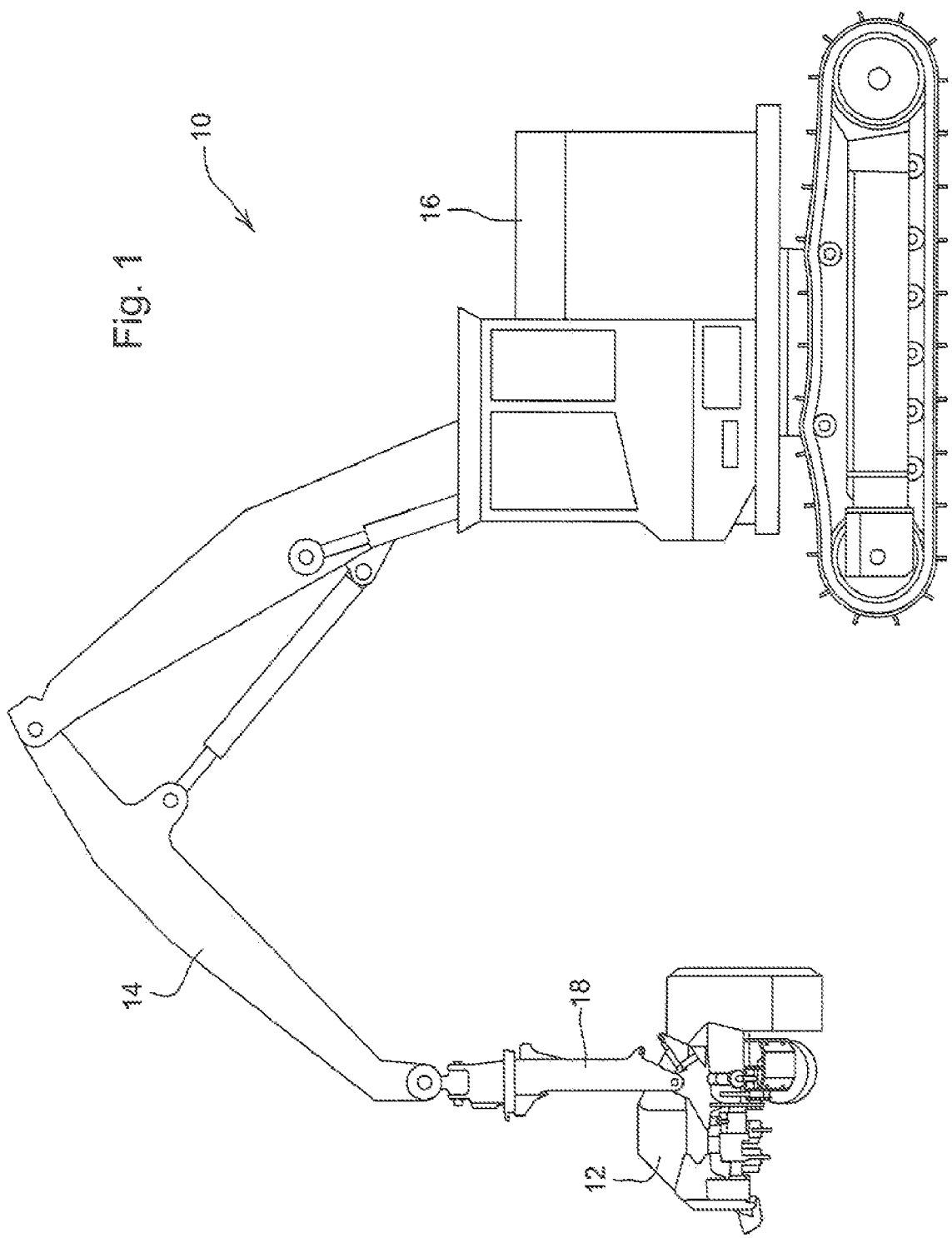
FIG. 1 is a side elevation view showing a tree harvester head attached to an end of an articulated boom of a forestry work machine.

Referring to FIG. 1, there is shown a forestry work machine 10 having a tree harvester head 12 illustratively mounted to an end of an articulated boom 14 supported on a carrier 16. The head 12 may be rotated relative to a hanger 18 to a generally vertical orientation for felling a tree. The head 12 may then be rotated relative to the hanger 18 to a generally horizontal orientation, as shown in FIG. 1, for further processing of the tree, including delimbing and cutting the tree in pieces of predetermined length.

Figure 2:
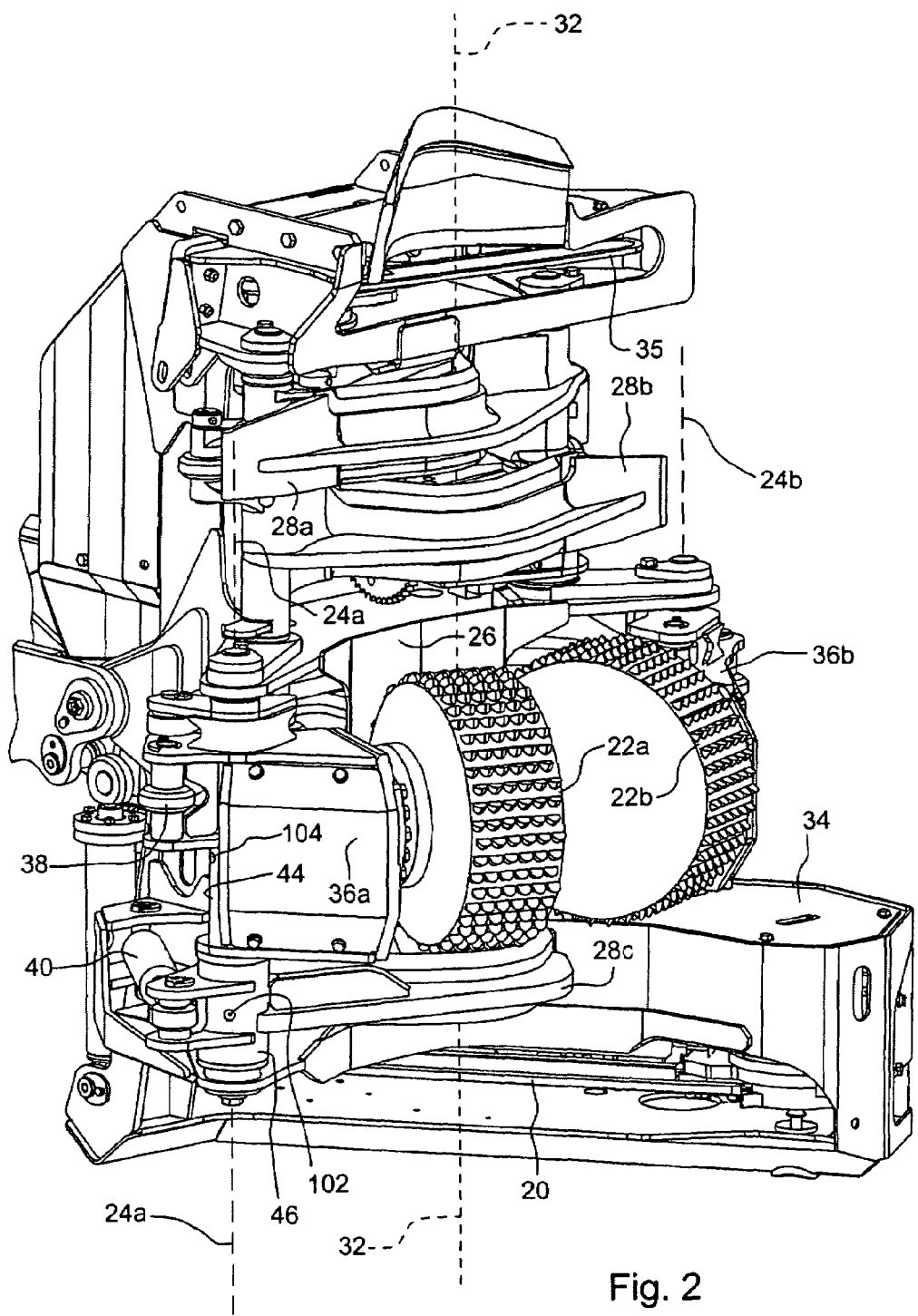
FIG. 2 is a perspective view of the tree harvester head.
Figure 3:
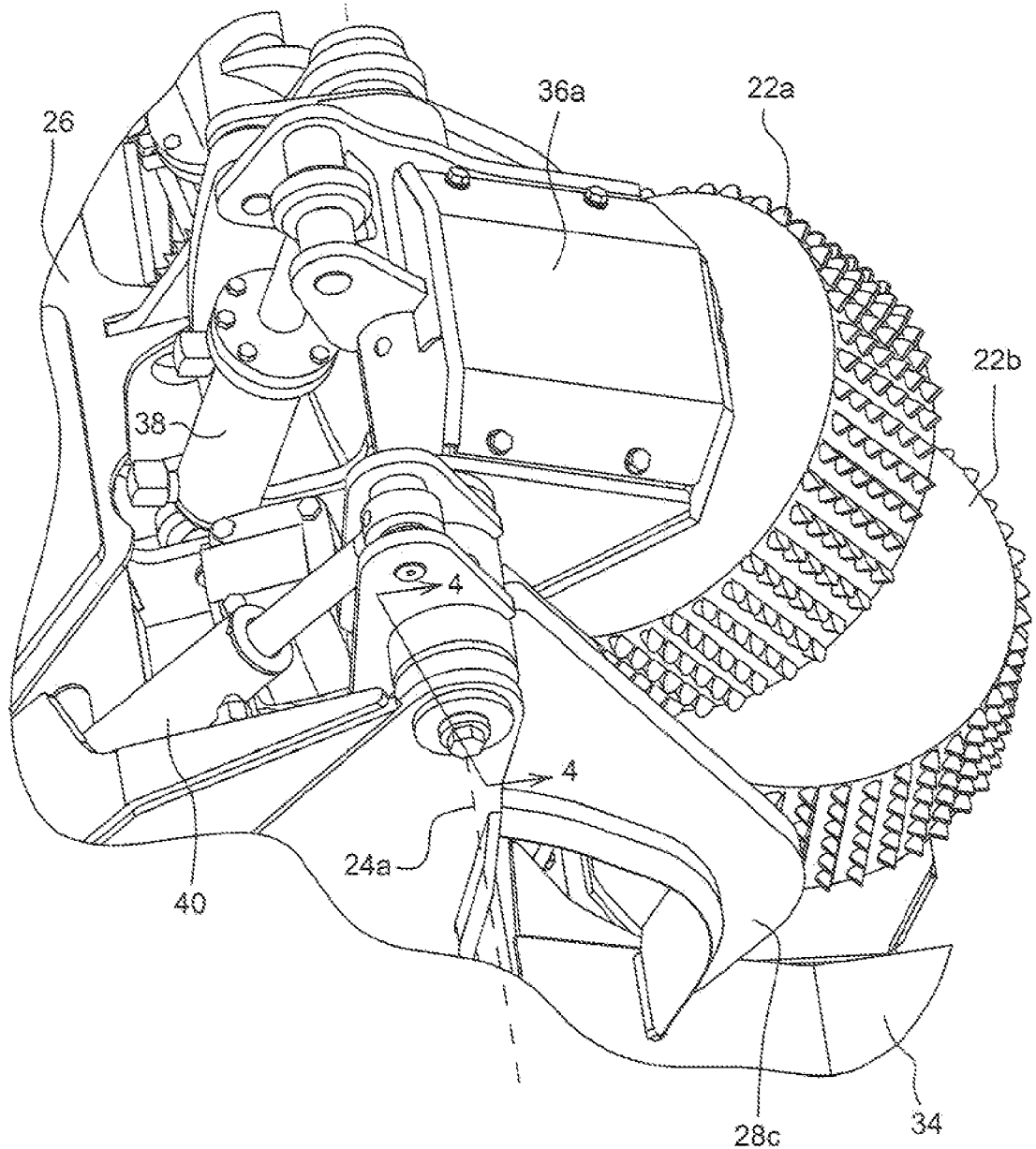
FIG. 3 is an enlarged perspective view of a portion of the tree harvester head.

Referring to FIGS. 2 and 3, components of the head 12 are shown enlarged. In the illustrated example, the head 12 has a butt saw 20 for felling a tree, a number of drive wheels 22 including drive wheels 22a, 22b mounted to rotate relative to a frame 26 about respective axes 24a, 24b and one or more other drive wheels (not shown) mounted in the frame 26, upper delimb knives 28a, 28b, and a lower delimb knife 28c across a tree-feeding path 32 (defined by the drive wheels, delimb knives, and frame) from a housing 34 for the butt saw 20. A chain saw 35 near upper delimb knives 28a, 28b is provided for cutting the tree in pieces of predetermined length.

The drive wheels 22 are operated by respective hydraulic motors to feed the tree held by the drive wheels 22a, 22b and the knives 28a, 28b, and 30 along the path 32 (the wheel cutouts of each drive wheel and the wheel mount between each drive wheel and respective motor not shown). The drive wheels 22a, 22b are mounted to the frame 36 for rotation relative thereto about axes 24a, 24b to embrace and release the tree. Drive arms 36a, 36b rotate the drive wheels 22a, 22b about the axes 24a, 24b in response to operation of respective hydraulic cylinders, one such hydraulic cylinder 38 shown best in FIG. 3.

The upper delimb knives 28a, 28b are mounted to the frame 36 for rotation relative thereto to embrace and release the tree. The knives 28a, 28b delimb the tree as the tree moved along the path 32 by the drive wheels.

The lower delimb knife 28c is mounted to the frame 36 for rotation relative thereto about the axis 24a to embrace and release the tree. A hydraulic cylinder 40 is provided for effecting such rotation of the knife 28c.

Figure 4:
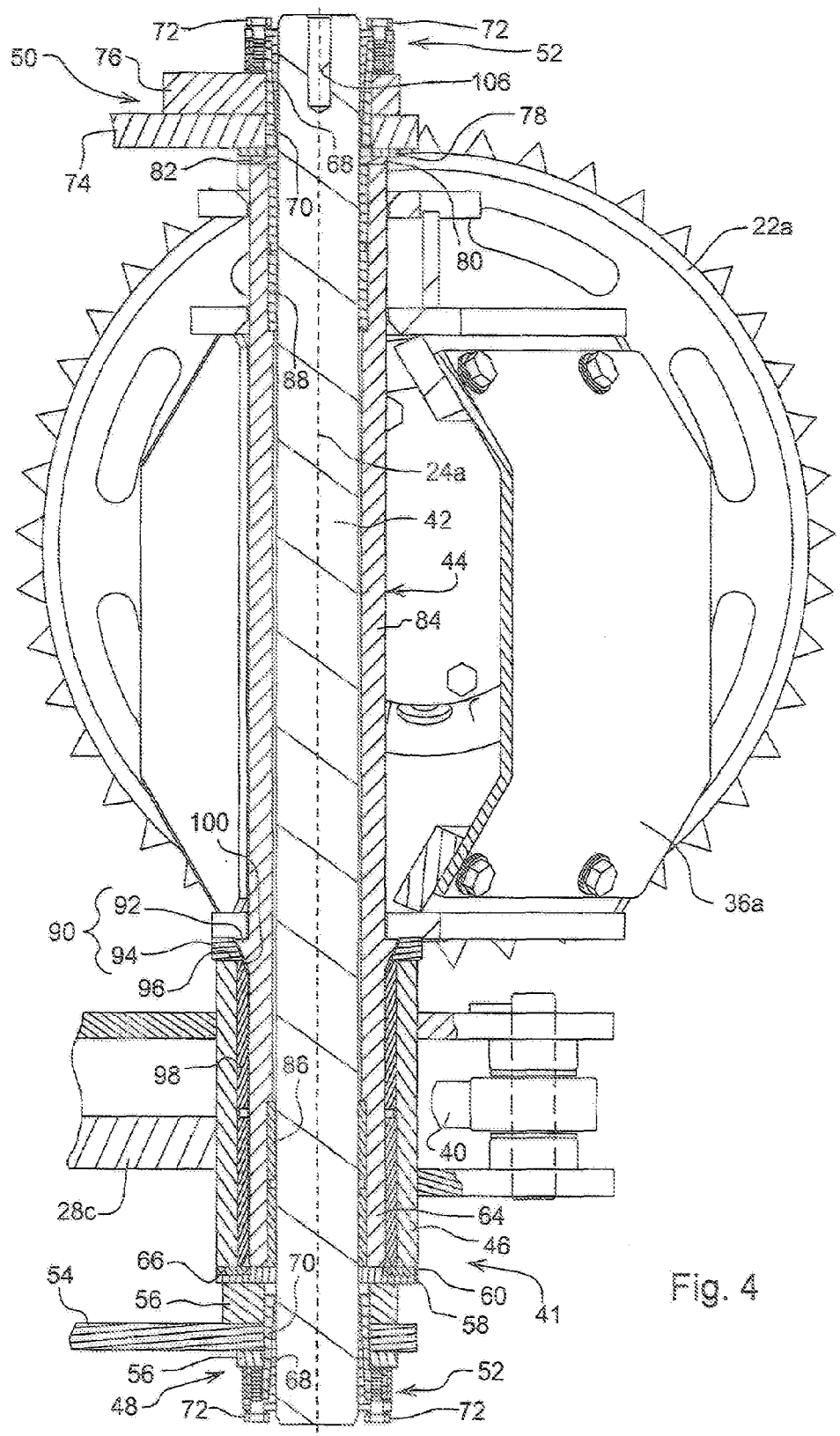
FIG. 4 is a sectional view taken along lines 4-4 of FIG. 3.

Referring to FIG. 4, an exemplary mounting arrangement 41 for mounting the drive wheel 22a and the lower delimb knife 28c for rotating about the axis 24a is shown. The mounting arrangement 41 includes a pin 42 defining the axis 24a, a wheel-mounting inner sleeve 44 to which the drive wheel 22a is mounted by the drive arm 36a secured to the drive wheel 22a and the inner sleeve 44, and a knife-mounting outer sleeve 46 to which the delimb knife 28c is mounted. The inner sleeve 44 surrounds the pin 42 for rotation of the inner sleeve 44 and the drive wheel 22a mounted thereto about the pin 42 and thus the axis 24a. The knife-mounting outer sleeve 46 surrounds the inner sleeve 44 for relative rotation therebetween for rotation of the knife 28c about the pin 42 and thus the axis 24a.

Opposite ends of the pin 42 are fixed to respective first and second supports 48, 50 of the frame 36 against rotation about axis 24a. The first support 48 has a lock 52 (e.g., TOL-LOCK®) press-fitted into a lower weldment portion of the frame 36, the weldment portion having a mounting plate 54 and bosses 56 secured on either side of the plate 54. The first support 48 further includes first washer 58 against a ring 56 of the weldment and a second washer 60 received by the first washer 58. An end face 62 of a first sleeve portion 64 of the inner sleeve 44 slidably contacts the first washer 58, and an end face 66 of the outer sleeve 46 slidably contacts the second washer 60. As such, each of the washers 58, 60 is made of a relatively low friction material (e.g., HT plate). The lock 52 has a tapered inner member 68, an oppositely tapered outer member 70 receiving the inner member 68, and a number of fasteners 72 wedging the members 68, 70 together so as to grip an end of the pin 42 against rotation about axis 24a.

The second support 50 employs another lock 52 press-fitted into an upper weldment portion of the frame 36. The upper weldment portion has a mounting plate 74 and bosses 76 and 78 secured thereto. Washer 80 acts between the upper weldment and an end face 82 of a second sleeve portion 84 of the inner sleeve 44 to which the drive arm 36a is secured, the washer 80 being made of a relatively low friction material for slidable movement of the end face 82 against the washer 80.

The inner sleeve 44 is thus captured between the first and second supports 48, 50 for rotation about the pin 42. Bushings 86, 88 are positioned between the sleeve portions 64, 84, respectively, to facilitate rotation of the sleeve 44 about the pin 42. The sleeve portion 84 of the inner sleeve 46 comprises a lubrication access point 104 (FIG. 2) in a side wall thereof for introduction of lubricant to the bushings 86, 88. The outer sleeve 46 surrounds the inner sleeve portion 64, the bushings 86, and the pin 42.

A retainer 90 is positioned between the first and second supports 48, 50 and cooperates with the first support 48 to capture the outer sleeve 46 between the first support 48 and the retainer 90. The retainer 90 comprises a frusto-conical member 92 formed on an outer surface of the inner sleeve 44 between the sleeve portions 64, 84 and a retainer ring 94 surrounding the frusto-conical member 92 so as to mate therewith and contacting an end face 96 of the outer sleeve 46 opposite the end face 66 of the outer sleeve 46 in contact with the washer 60 of the first support 48.

A bushing 98 is positioned between the outer sleeve 46 and the sleeve portion 64 of the inner sleeve 44. The bushing 98 comprises a chamfer 100 surrounding a portion of the frusto-conical member 92 so as to establish a clearance therebetween. The outer sleeve 46 comprises a lubrication access point 102 (FIG. 2) in a side wall thereof for introduction of lubricant to the bushing 98.

The delimb knife 28c, the outer sleeve 46, and the sleeve portion 64 surrounded by the outer sleeve 46 are positioned along the tree-feeding path 32 between the drive wheel 22a and the butt saw 20. Further, the outer sleeve 46 and the sleeve portion 64 surrounded thereby are positioned across the tree-feeding path 32 from the butt saw housing 34.

The mounting arrangement 41 thus provides a relatively efficient use of space on the harvester head 12. Further, it promotes handling of relatively high stresses imparted to the delimb knife 28c during operation, and is relatively readily serviceable.

To service the mounting arrangement 41, the fasteners 72 are loosened to relax the grip of the locks 52 on the ends of the pin 42. A tool is inserted into a tool-receiving opening 106 formed in an end of the pin 42 to pull out the pin 42. The inner and outer sleeves 44, 46 with the associated bushings 86, 88, 98 and retainer 90 may then be removed from the gap between the supports 48, 50 to allow repair or replacement of the components.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A tree harvester head, comprising:
    a frame,
    a drive wheel,
    a delimb knife,
    a pin fixed to the frame,
    a wheel-mounting inner sleeve to which the drive wheel is mounted, the wheel-mounting inner sleeve rotatably mounted to and surrounding the pin such that the pin is positioned within the wheel-mounting inner sleeve, and
    a knife-mounting outer sleeve to which the delimb knife is mounted, the knife-mounting outer sleeve rotatably mounted to and surrounding the wheel-mounting inner sleeve so as to be rotatably mounted to and surround the pin such that the wheel-mounting sleeve is positioned within the knife-mounting outer sleeve radially between the pin and the knife-mounting sleeve.

2. The tree harvester head of claim 1, comprising a drive arm, wherein the wheel-mounting inner sleeve comprises a first sleeve portion and a second sleeve portion, the first and second sleeve portions are aligned relative to the length of the wheel-mounting inner sleeve, the drive arm is secured to the first sleeve portion and the drive wheel so as to extend therebetween, and the knife-mounting outer sleeve surrounds the second sleeve portion.

3. The tree harvester head of claim 2, comprising a butt saw, another drive wheel rotatably mounted to the frame, and additional delimb knives rotatably mounted to the frame, wherein the drive wheels, the delimb knives, and the frame cooperate so as to define a tree-feeding path, and the delimb knife, the knife-mounting outer sleeve, and the second sleeve portion surrounded by the knife-mounting outer sleeve are positioned along the tree-feeding path between the drive wheel and the butt saw.

4. The tree harvester head of claim 3, comprising a housing for the butt saw, wherein the knife-mounting outer sleeve and the second sleeve portion surrounded thereby are positioned across the tree-feeding path from the housing.

5. The tree harvester head of claim 1, comprising a drive arm a first support, a second support cooperating with the first support to capture the wheel-mounting inner sleeve therebetween, and a retainer positioned between the first and second supports and cooperating with the first support to capture the knife-mounting outer sleeve between the first support and the retainer.

6. The tree harvester head of claim 5, wherein the retainer comprises a frusto-conical member formed on an outer surface of the wheel-mounting inner sleeve and a retainer ring surrounding the frusto-conical member and contacting a first end face of the knife-mounting outer sleeve opposite a second end face of the knife-mounting outer sleeve in contact with the first support.

7. The tree harvester head of claim 1, comprising a frusto-conical member formed on an outer surface of the wheel-mounting inner sleeve.

8. The tree harvester head of claim 7, comprising a retainer ring surrounding the frusto-conical member so as to mate therewith and contacting an end face of the knife-mounting outer sleeve.

* * * * *